(12) United States Patent
Chen et al.

(10) Patent No.: US 9,742,653 B2
(45) Date of Patent: Aug. 22, 2017

(54) MAINTENANCE METHOD FOR NETWORK CONNECTION AND COMPUTER SYSTEM

(71) Applicant: Acer Incorporated, New Taipei (TW)

(72) Inventors: Kuan-Yu Chen, New Taipei (TW); Shu-Chun Liao, New Taipei (TW); Ching-Ho Tsai, New Taipei (TW)

(73) Assignee: Acer Incorporated, New Taipei (TW)

( * ) Notice: Subject to any disclaimer, the term of this patent is extended or adjusted under 35 U.S.C. 154(b) by 106 days.

(21) Appl. No.: 14/601,249

(22) Filed: Jan. 21, 2015

(65) Prior Publication Data

US 2016/0134500 A1  May 12, 2016

(30) Foreign Application Priority Data

Nov. 12, 2014  (TW) .............................. 103139204 A

(51) Int. Cl.
  H04L 12/26 (2006.01)
  G06F 1/32 (2006.01)
  G06F 1/14 (2006.01)
  H04L 12/12 (2006.01)
  H04L 29/08 (2006.01)

(52) U.S. Cl.
  CPC .............. *H04L 43/103* (2013.01); *G06F 1/14* (2013.01); *G06F 1/3203* (2013.01); *G06F 1/3209* (2013.01); *G06F 1/329* (2013.01); *H04L 12/12* (2013.01); *H04L 43/0811* (2013.01); *H04L 43/0817* (2013.01); *H04L 67/145* (2013.01); *Y02B 60/34* (2013.01)

(58) Field of Classification Search
  None
  See application file for complete search history.

(56) References Cited

U.S. PATENT DOCUMENTS

| 8,135,392 | B2 * | 3/2012 | Marcellino | ........... H04L 12/587 455/414.1 |
| 2013/0007484 | A1 * | 1/2013 | Gobriel | ................. G06F 1/3209 713/320 |
| 2013/0034009 | A1 * | 2/2013 | Tazebay | .................. H04L 12/12 370/252 |
| 2014/0254409 | A1 * | 9/2014 | Tsai | ...................... H04W 24/04 370/252 |

* cited by examiner

Primary Examiner — Joseph Bednash
(74) Attorney, Agent, or Firm — Jianq Chyun IP Office

(57) ABSTRACT

A maintenance method for network connection and a computer system are provided. The method is adapted to a computer system having a real-time clock. The real-time clock is configured to regularly wake up the computer system to check whether a network connection is working normally. In the method, a wake up operation to wake up the computer system is received from a user. It is determined whether a connection time of maintaining the network connection so far from a last time of entering a power saving mode is greater than a counting time for the real-time clock to wake up the computer system. It is tested whether the network connection is working normally when the connection time is greater than the counting time. The counting time of the real-time clock is updated to the connection time when the network connection is working normally.

8 Claims, 4 Drawing Sheets

MAINTENANCE METHOD FOR NETWORK CONNECTION AND COMPUTER SYSTEM

CROSS-REFERENCE TO RELATED APPLICATION

This application claims the priority benefit of Taiwan application serial no. 103139204, filed on Nov. 12, 2014. The entirety of the above-mentioned patent application is hereby incorporated by reference herein and made a part of this specification.

BACKGROUND

Technical Field

The invention relates to a maintenance method for network connection, and particularly relates to a method for maintaining a network connection by regularly waking up a system and a computer system thereof.

Related Art

In recent years, along with quick development of computer technology, remote control techniques become more and more popular. A user can operate a computer system from a remote end through a network at anywhere anytime. For example, the user at home can operate a computer system in office through remote control, so as to obtain required data or perform remote operations. A system manager can obtain information such as a hardware status, a system event log, etc. of the computer system from the remote end through remote control, so as to learn the status of the computer system at anytime without being limited by time and space.

In today's remote control techniques, the user can perform an operation of wake on LAN (WOL) to a computer system that has entered a power saving mode through a network via a transmission control protocol (TCP), so as to access data in the computer system from the remote end. However, after the computer system enters the power saving mode for a period of time, a network connection established through the TCP is probably interrupted, which may result in a fact that the user cannot implement the WOL to the computer system through the network. Therefore, the computer system generally has a mechanism capable of automatically recovering from the power saving mode to a normal mode for maintaining the network connection, such that the remote control can continually work normally.

Regarding the aforementioned mechanism of automatically recovering from the power saving mode, although the current computer system can be automatically waken up during the network interruption through a setting of a network card, a design cost of the network card is relatively high, and the network connection cannot be maintained in case that an Internet protocol address (IP address) is changed according to a dynamic host configuration protocol (DHCP) or a point-to-point protocol over Ethernet (PPPoE). Therefore, a real-time clock (RTC) can be used to wake up the computer system in a regular way, so as to maintain the network connection. However, a connection time that the computer system maintains a normal operation of the network connection under the power saving mode can be different according to different network environments, which leads to difficulty in setting of a counting time of the RTC for waking up the computer system, and if the counting time is too long, the network interruption cannot be effectively prevented, and if the counting time is too short, a power consumption of the computer system is increased and a hardware service life thereof is decreased due to too frequent wakeup of the computer system.

SUMMARY

The invention is directed to a maintenance method for network connection and a computer system, by which a counting time of a real-time clock (RTC) is gradually adjusted to a counting time that is most suitable for a current network environment, so as to maintain a normal operation of the network connection and avoid unnecessary cost waste.

The invention provides a maintenance method for network connection, which is adapted to a computer system having a real-time clock. The real-time clock is configured to regularly wake up the computer system to check whether a network connection is working normally. In the method, a wake up operation of the computer system is received from a user to wake up the computer system. Then, it is determined whether a connection time that the computer system maintains the network connection so far from a last time of entering a power saving mode is greater than a counting time for the real-time clock to wake up the computer system. It is tested whether the network connection is working normally when the connection time is greater than the counting time. The counting time of the real-time clock is updated to the connection time when the network connection is working normally.

The invention provides a computer system including an input unit, a network card, a real-time clock and a processor. The input unit receives a wake up operation. The network card establishes a network connection. When the computer system enters a power saving mode, the real-time clock regularly wakes up the computer system to determine whether the network connection is working normally. The processor receives a wake up operation of the computer system from a user through the input unit to wake up the computer system, and determines whether a connection time that the computer system maintains the network connection established by the network card so far from a last time of entering the power saving mode is greater than a counting time for the real-time clock to wake up the computer system. The processor tests whether the network connection is working normally when the connection time is greater than the counting time. The processor updates the counting time of the real-time clock to the connection time when the network connection is working normally.

According to the above descriptions, the maintenance method for network connection and the computer system of the invention use the real-time clock to regularly wake up the computer system in the power saving mode to maintain a normal operation of the network connection. Moreover, the actual connection time of the computer system in the power saving mode under the current network environment is determined, so as to dynamically adjust the counting time of the real-time clock. In this way, the counting time of the real-time clock is gradually adjusted to a time length that is more suitable for the current network environment, so as to reduce unnecessary power consumption and prolong a service life of computer hardware under a premise of successfully maintaining the network connection.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

When a computer system is in an idle state, the computer system generally enters a power saving mode to avoid unnecessary power consumption. Therefore, in the invention, when the computer system enters the power saving mode, a real-time clock (RTC) can be used to regularly wake up the computer system to maintain a network connection, so as to effectively maintain a normal operation of the network connection of the computer system. In this way, a user can access data and status of the computer system at anytime anywhere to achieve a remote control effect.

Figure 1:
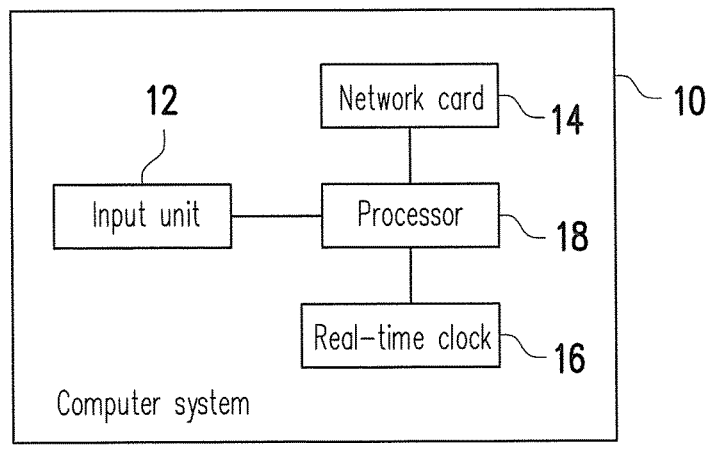
FIG. 1 is a block diagram of a computer system according to an embodiment of the invention.

FIG. 1 is a block diagram of a computer system according to an embodiment of the invention. Referring to FIG. 1, the computer system 10 of the present embodiment is, for example, a computing device such as a desktop computer, a notebook, a server, etc., which includes an input unit 12, a network card 14, an RTC 16 and a processor 18, and functions thereof are described as follows.

The input unit 12 is, for example, a mouse, a keyboard, a touchpad or a touch panel having a resistive, a capacitive or other types of touch sensing element, which is capable of receiving a wake up operation of the computer system 10 from the user, so as to wake up the computer system 10 in the power saving mode.

The network card 14 is, for example, a wireless network card supporting a wireless communication standard such as institute of electrical and electronics engineers (IEEE) 802.11n/b/g, etc., or a network card supporting a cable network connection, which can establish a network connection with other external devices through a wireless or wired manner.

The RTC 16 can be any element having a timing function. When the computer system 10 enters the power saving mode, the RTC 16 can regularly wake up the computer system 10 to check whether the network connection of the computer system 10 is working normally.

The processor 18 is, for example, a central processing unit (CPU), or a programmable general purpose or special purpose microprocessor, a digital signal processor (DSP), a programmable controller, an application specific integrated circuit (ASIC), a programmable logic device (PLD) or other similar devices, or a combination of the above devices. The processor 14 is coupled to the input unit 12, the network card 14 and the RTC 16 to implement a maintenance function of the network connection. An embodiment is provided below to describe detailed steps of maintaining the network connection of the computer system 10.

Figure 2:
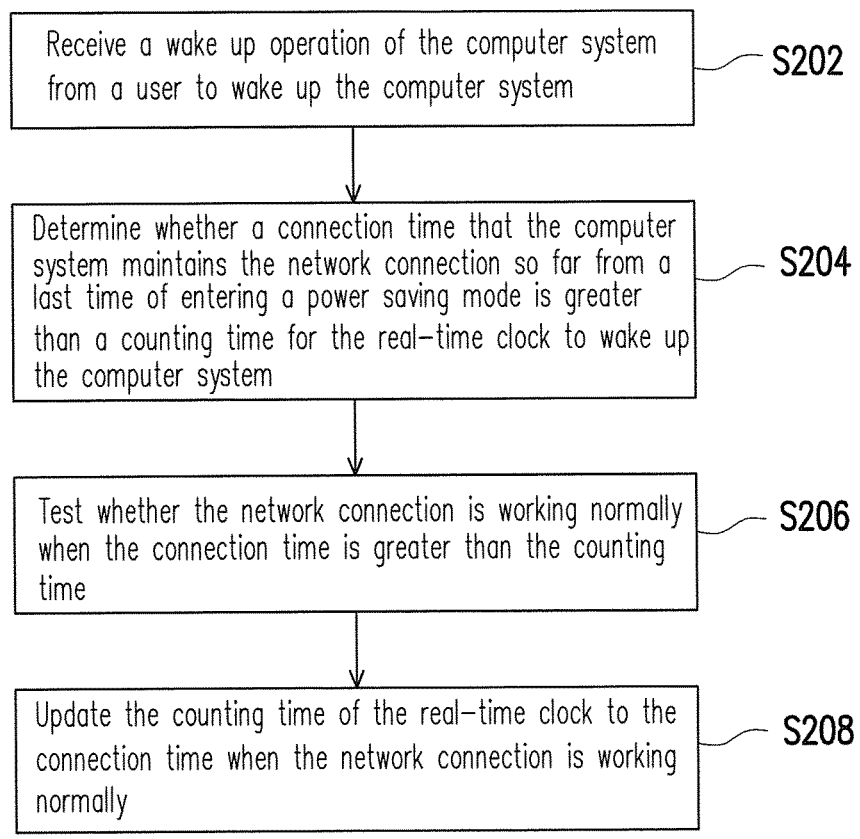
FIG. 2 is a flowchart illustrating a maintenance method for network connection according to an embodiment of the invention.

FIG. 2 is a flowchart illustrating a maintenance method for network connection according to an embodiment of the invention. Referring to FIG. 1 and FIG. 2, the maintenance method for network connection of the present embodiment is adapted to the computer system 10 of FIG. 1, and steps of the maintenance method for network connection of the invention are described below with reference of various components of the computer system 10.

In step S202, the processor 18 can receive a wake up operation of the computer system 10 from a user through the input unit 12 to wake up the computer system 10. In detail, in an embodiment, the input unit 12 is, for example, a mouse, a keyboard, a touchpad or a touch panel. When the user performs the wake up operation of the computer system 10 through the input unit 12 (for example, the user moves the mouse or clicks the keyboard, the touchpad and the touch panel, etc.), the processor 18 can receive the wake up operation through the input unit 12, and accordingly wakes up the computer system 10 in the power saving mode to restore a normal mode thereof. It should be noticed that the power saving mode of the computer system 10 is, for example, the S3 mode specified by an advanced configuration and power interface (ACPI), and the normal mode of the computer system 10 is, for example, the S0 mode, though the invention is not limited thereto.

Then, in step S204, the processor 18 can determine whether a connection time that the computer system 10 maintains the network connection so far from a last time of entering the power saving mode is greater than a counting time for the RTC 16 to wake up the computer system 10. To be specific, when the computer system 10 is operated by the user to recover the normal mode from the power saving mode, the processor 18 can determine whether the connection time that the computer system 10 maintains the network connection from a last time of entering the power saving mode according to an operation of a user till a time of being waken up by the user is greater than the counting time of the RTC 16. During a period that the computer system 10 of the present embodiment enters the power saving mode till the time of being waken up by the user, the RTC 16 can regularly wake up the computer system 10 according to the counting time to maintain the network connection.

Then, in step S206, when the connection time is greater than the counting time of the RTC 16, the processor 18 tests whether the network connection is working normally. For example, in an embodiment, the processor 18 transmits a test packet to a remote server (not shown) by using the network card 14, and determines whether receiving an acknowledgement packet transmitted by the remote server in response to the test packet, so as to determine whether the network connection of the computer system 10 is working normally, though the invention is not limited thereto.

Finally, in step S208, when the network connection is working normally, the processor 18 updates the counting time of the RTC 16 to the connection time. To be specific, when the network connection is working normally, the processor 18 updates the counting time of the RTC 16 to the connection time, so as to dynamically adjust the counting time of the RTC 16 to a time length that is more suitable for the current network environment.

In another embodiment, when the computer system is waken up by the user, if the connection time that the computer system maintains the network connection in the power saving mode is not greater than the counting time of the RTC, the RTC can continually accumulate for an extended time before the network connection is tested, so as to effectively adjust the counting time of the RTC.

Figure 3:
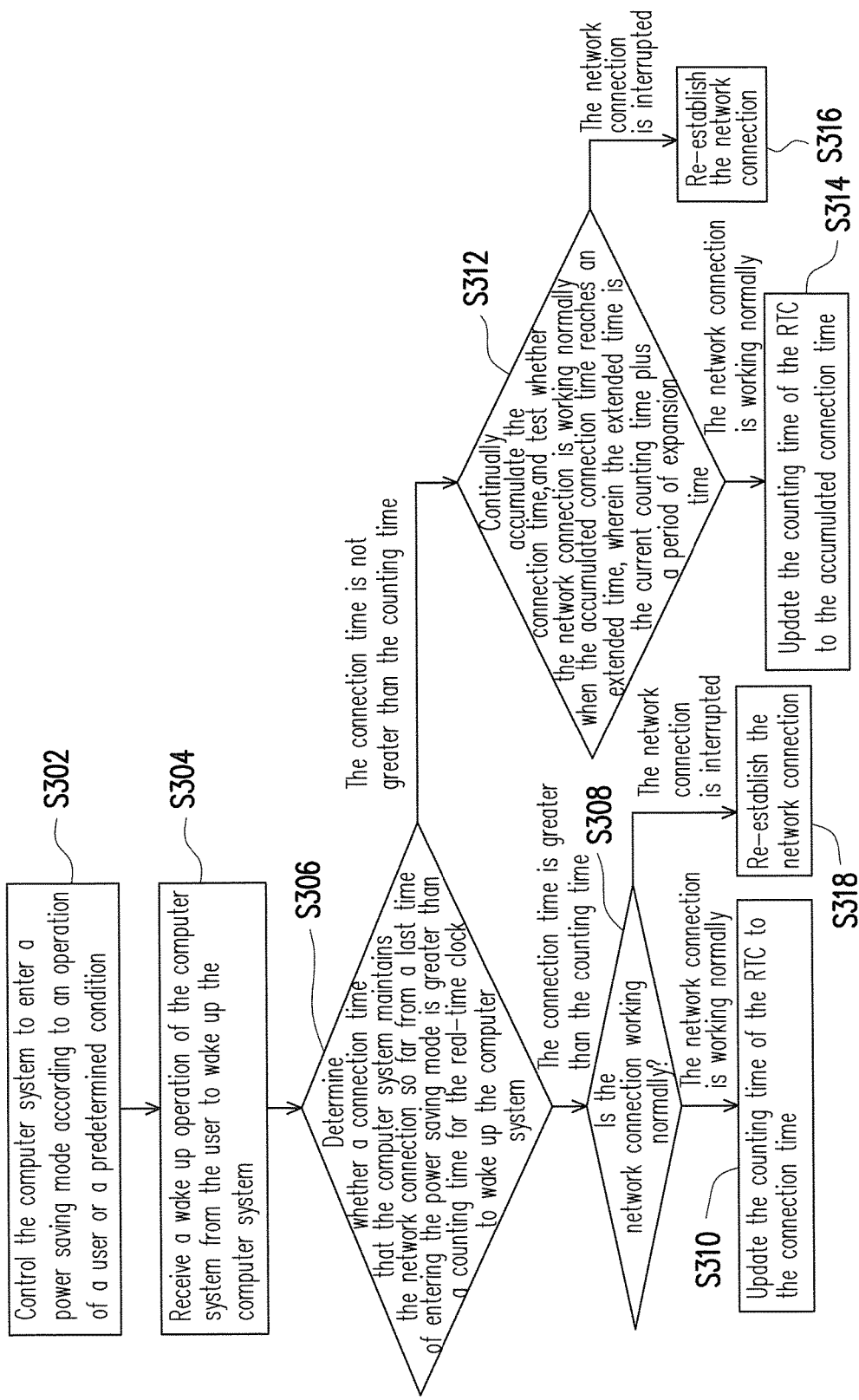
FIG. 3 is a flowchart illustrating a maintenance method for network connection according to an embodiment of the invention.

In detail, FIG. 3 is a flowchart illustrating a maintenance method for network connection according to an embodiment of the invention. Referring to FIG. 1 and FIG. 3, the maintenance method for network connection of the present embodiment is adapted to the computer system 10 of FIG. 1, and steps of the maintenance method for network connection of the invention are described below with reference of various components of the computer system 10.

In step S302, the processor 18 can control the computer system to enter the power saving mode according to an operation of a user or a predetermined condition. To be specific, the user can conduct a manual operation; for example, press a power switch to manually notify the processor 18 to control the computer system to enter the power saving mode. Alternatively, the user can set a predetermined condition in an operating system (for example, Microsoft Windows) executed by the computer system 10, for example, the predetermined condition is that a system idle time is greater than a predetermined time, and when the predetermined condition is satisfied, the processor 18 is automatically notified to control the computer system 10 to enter the power saving mode.

In step S304, the processor 18 can receive the wake up operation of the computer system 10 from the user through the input unit 12, so as to wake up the computer system 10. Then, in step S306, the processor 18 can determine whether a connection time that the computer system 10 maintains the network connection so far from a last time of entering the power saving mode is greater than a counting time for the RTC 16 to wake up the computer system 10. If the connection time is greater than the counting time, in step S308, the processor 18 tests whether the network connection is working normally. If the network connection is working normally, in step S310, the processor 18 updates the counting time of the RTC 16 to the connection time. The steps S304, S306, S308 and S310 are respectively the same or similar to the steps S202, S204, S206 and S208 of the aforementioned embodiment, and details thereof are not repeated.

Different to the aforementioned embodiment, after the step S306, if the connection time of maintaining the network connection is not greater than the counting time of the RTC 16, in step S312, the RTC 16 can continually accumulate the connection time. Moreover, when the accumulated connection time reaches an extended time, the processor 18 can test whether the network connection is working normally, where the extended time is the current counting time plus a period of expansion time. To be specific, when the computer system 10 is waken up by the user, if the connection time of maintaining the network connection so far from the last time of entering the power saving mode (not including a situation of entering the power saving mode due to regular wakeup of the RTC 16) till the time of being waken up is not greater than the counting time of the RTC 16, the RTC 16 can continually accumulate the connection time, and when the connection time reaches the current counting time plus a period of expansion time (i.e., the extended time), the processor 18 tests whether the network connection is working normally.

If the network connection is working normally, in step S314, the processor 18 updates the counting time of the RTC 16 to the accumulated connection time, so as to adjust the counting time to a more suitable length (which is more suitable for the current network environment).

If the network connection is interrupted, in step S316, the processor 18 does not adjust the counting time, and re-establishes the network connection by using the network card 14, such that the user can use other devices to perform remote control to the computer system 10 through the network. For example, the processor 18 can execute a network module in the operating system of the computer system 10 to re-establish the network connection between the computer system 10 and the Internet by using the network card 14, though the invention is not limited thereto.

Similarly, after the step S308, if the network connection is interrupted, in step S318, the processor 18 does not adjust the counting time, and re-establishes the network connection by using the network card 14.

It should be noticed that in an embodiment, it is assumed that after the counting time of the RTC is adjusted according to the aforementioned method, a situation of network interruption is encountered when the RTC regularly wakes up the computer system, the counting time of the RTC can be recovered to a predetermined value for readjustment.

Figure 4:
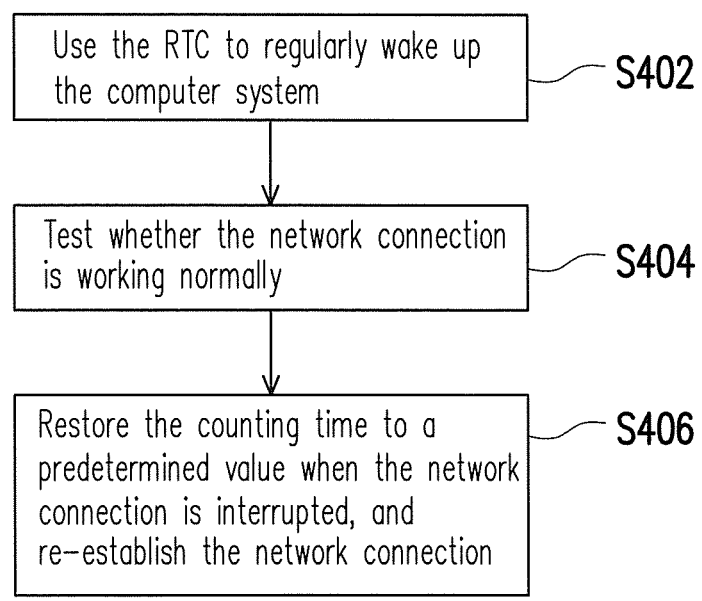
FIG. 4 is a flowchart illustrating a maintenance method for network connection according to an embodiment of the invention.

In detail, FIG. 4 is a flowchart illustrating a maintenance method for network connection according to an embodiment of the invention. Referring to FIG. 1 and FIG. 4, the maintenance method for network connection of the present embodiment is adapted to the computer system 10 of FIG. 1, and steps of the maintenance method for network connection of the invention are described below with reference of various components of the computer system 10.

In step S402, the processor 18 regularly wakes up the computer system 10 by using the RTC 16. To be specific, when the computer system 10 enters the power saving mode, the RTC 16 keeps counting, and each time when the counting reaches a predetermined counting time, the RTC 16 wakes up the computer system 10.

Then, in step S404, the processor 18 can test whether the network connection is working normally. To be specific, each time when the computer system 10 is waken up by the RTC 16; the processor 18 can test whether the network connection is working normally.

In step S406, if the network connection is interrupted, the processor 18 controls the RTC 16 to restore the counting time to a predetermined value, and re-establishes the network connection by using the network card 14. To be specific, when the computer system 10 is regularly waken up by the RTC 16, and it is tested that the network connection is interrupted, the processor 18 can control the RTC 16 to restore the counting time to the predetermined value, so as to readjust the counting time of the RTC 16, and re-establish the network connection by using the network card 14.

Figure 5:
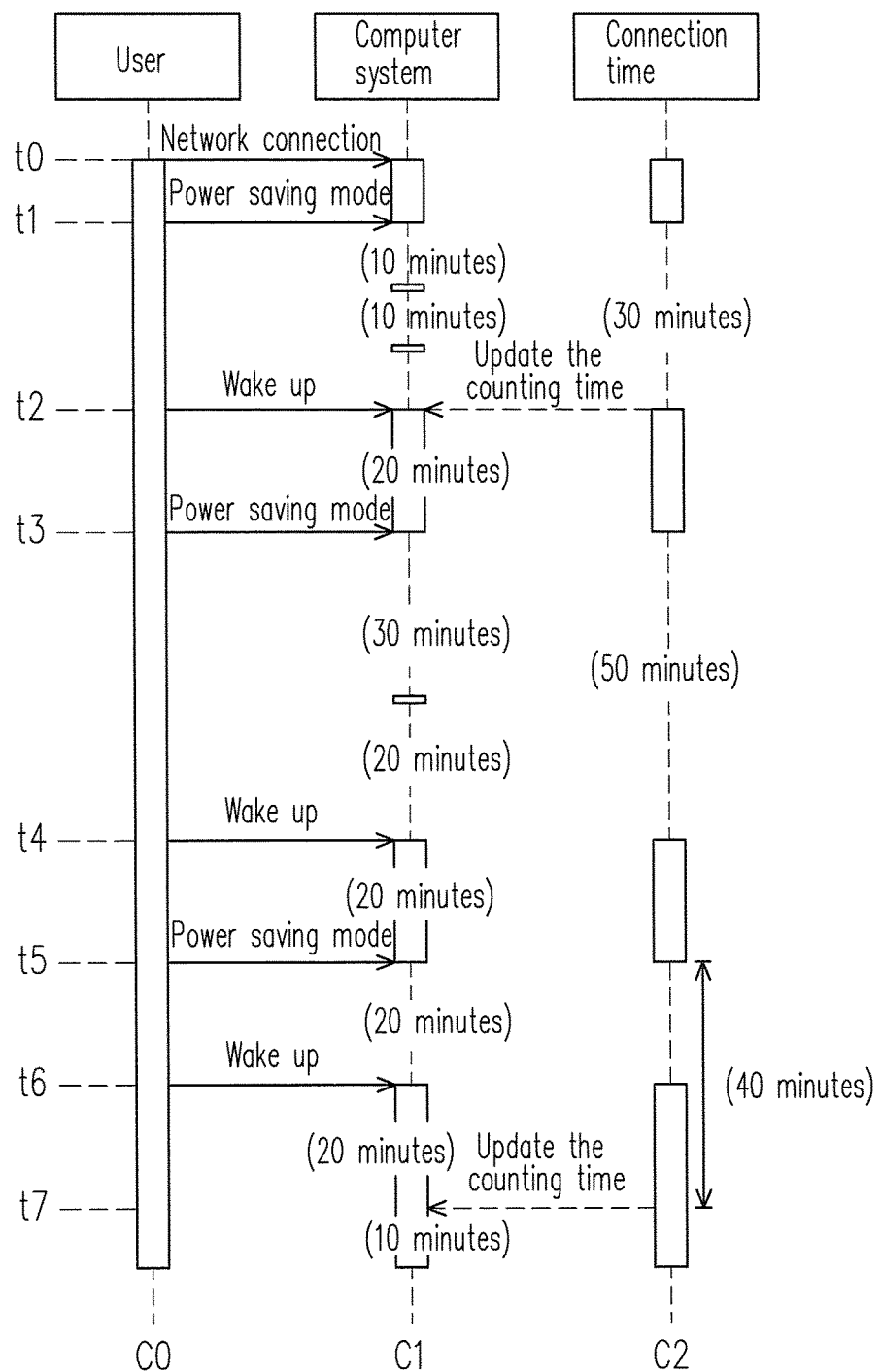
FIG. 5 is an example of a maintenance method for network connection according to an embodiment of the invention.

In another embodiment, the computer system can gradually adjust the counting time of the RTC by repeating the steps of the aforementioned maintenance method for network connection. For example, FIG. 5 is an example of the maintenance method for network connection according to an embodiment of the invention. Referring to FIG. 1 and FIG. 5, the example of the maintenance method for network connection of the present embodiment is adapted to the computer system 10 of FIG. 1. In the present example, an interactive relationship between the operations of a user at different time points and the computer system 10 is used to describe the maintenance method for network connection of the invention. In FIG. 5, an axis C0 to the left represents the operations of the user, an axis C1 in the middle represents the operations of the computer system 10, and an axis C2 to the right represents the connection time that the computer system 10 maintains the network connection after entering the power saving mode. Moreover, in the present embodiment, for simplicity's sake, the counting time of the RTC 16 is predetermined to 10 minutes at the beginning, and an actual connection time that the computer system 10 maintains the network connection after entering the power saving mode is assumed to be 45 minutes. The example of the maintenance method for network connection of the invention is described below with reference of various components of the computer system 10.

At a time point t0, the user operates the computer system 10 to establish the network connection. Then, at a time point t1, the user operates the computer system 10 to enter the power saving mode. After entering the power saving mode, the RTC 16 of the computer system 10 can regularly wake up the computer system 10 to test the network connection according to the preset counting time (10 minutes).

After 30 minutes, at a time point t2, the user wakes up the computer system 10, and after the processor 18 of the computer system 10 determines that the connection time (30 minutes) of maintaining the network connection so far from a last time (the time point t1) that the computer system 10 is operated by the user to enter the power saving mode is greater than the counting time (10 minutes) for the RTC 16 to regularly wake up the computer system 10, the processor 18 tests whether the network connection is working normally. Now, since the connection time that the computer system 10 maintains the network connection after entering the power saving mode is only 30 minutes, which is not greater than the actual connection time of 45 minutes, the test result indicates that the network connection is working normally. Therefore, the computer system 10 updates the counting time of the RTC 16 to the connection time (30 minutes).

Then, after 20 minutes, at a time point t3, the user again operates the computer system 10 to enter the power saving mode. After entering the power saving mode, the RTC 16 of the computer system 10 can regularly wake up the computer system 10 to test the network connection according to the current counting time (30 minutes).

After 50 minutes, at a time point t4, the user wakes up the computer system 10, after the processor 18 of the computer system 10 determines that the connection time (50 minutes) of maintaining the network connection so far from a last time (the time point t3) that the computer system 10 is operated by the user to enter the power saving mode is greater than the counting time (30 minutes) for the RTC 16 to regularly wake up the computer system 10, the processor 18 can test whether the network connection is working normally. At this time, since the connection time that the computer system 10 maintains the network connection after entering the power saving mode is 50 minutes, which is greater than the actual connection time of 45 minutes, the test result at the time point t4 indicates that the network connection is interrupted. Therefore, the computer system 10 does not update the counting time of the RTC 16 to the connection time (50 minutes), but re-establishes the network connection through the network card 14.

Then, after 20 minutes, at a time point t5, the user again operates the computer system 10 to enter the power saving mode. After the computer system enters the power saving mode for 20 minutes, at a time point t6, the user wakes up the computer system 10. Moreover, since the processor 18 of the computer system 10 can determine that the connection time (20 minutes) of maintaining the network connection so far from a last time (the time point t5) that the computer system 10 is operated by the user to enter the power saving mode is not greater than the counting time (30 minutes) for the RTC 16 to regularly wake up the computer system 10, the RTC 16 of the computer system 10 can continually accumulate the connection time, and it is tested whether the network connection is working normally after the accumulated connection time reaches an extended time. In FIG. 5, the extended time is the current counting time (30 minutes) plus a period of expansion time (10 minutes). Then, at a time point t7 counted from the last time (the time point t5) that the computer system 10 is operated by the user to enter the power saving mode till the extended time (40 minutes), it is tested whether the network connection of the computer system 10 is working normally. At this time, since the connection time that the computer system 10 maintains the network connection after entering the power saving mode is only 40 minutes, which is not greater than the actual connection time of 45 minutes, the test result indicates that the network connection is working normally. Therefore, the processor 18 of the computer system 10 can update the counting time of the RTC 16 to the accumulated connection time (40 minutes), i.e., the counting time is adjusted from 30 minutes to 40 minutes, such that the counting time of the RTC 16 is more close to the actual connection time of the computer system 10 after entering the power saving mode under the current network environment.

In summary, the maintenance method for network connection and the computer system of the invention use the RTC to wake up the computer system in the power saving mode to maintain a normal operation of the network connection. Moreover, the counting time of the RTC can be dynamically adjusted according to the actual connection time of the computer system measured when the computer system is waken up by the user. In this way, the counting time of the RTC is adjusted to a time length that is more suitable for the current network environment, so as to reduce unnecessary power consumption and prolong a service life of computer hardware.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A maintenance method for network connection, adapted to a computer system having a real-time clock, wherein the real-time clock is configured to regularly wake up the computer system to check whether a network connection is working normally, the maintenance method for network connection comprising:
   receiving a wake up operation of the computer system from a user to wake up the computer system;
   determining whether an accumulated time length accumulated from a time of last entering a power saving mode according to a saving operation of the user to a time of receiving the wake up operation is greater than a counting time for the real-time clock to wake up the computer system;
   testing whether the network connection is working normally when the accumulated time length is greater than the counting time; and
   updating the counting time of the real-time clock to the accumulated time length when the network connection is working normally.

2. The maintenance method for network connection as claimed in claim 1, wherein after the step of determining whether the accumulated time length is greater than the counting time, the method further comprise:
   continually accumulating the accumulated time length when the accumulated time length is not greater than the counting time, and testing whether the network connection is working normally when the accumulated time length reaches an extended time, wherein the extended time is the counting time plus a period of expansion time;

updating the counting time of the real-time clock to the accumulated time length when the network connection is working normally; and re-establishing the network connection when the network connection is interrupted.

3. The maintenance method for network connection as claimed in claim 1, further comprising:

using the real-time clock to regularly wake up the computer system;

testing whether the network connection is working normally; and restoring the counting time to a predetermined value when the network connection is interrupted, and re-establishing the network connection.

4. The maintenance method for network connection as claimed in claim 1, wherein before the step of receiving the wake up operation of the computer system from the user to wake up the computer system, the method further comprises:

controlling the computer system to enter the power saving mode according to an operation of the user or a predetermined condition.

5. A computer system, comprising:

an input unit, receiving a wake up operation;

a network card, establishing a network connection;

a real-time clock, wherein when the computer system enters a power saving mode, the real-time clock regularly wakes up the computer system to determine whether the network connection is working normally; and a processor, coupled to the input unit, the network card and the real-time clock, receiving a wake up operation of the computer system from a user through the input unit to wake up the computer system, and determining whether an accumulated time length accumulated from a time of last entering the power saving mode according to a saving operation of the user to a time of receiving the wake up operation is greater than a counting time for the real-time clock to wake up the computer system, wherein the processor tests whether the network connection is working normally when the accumulated time length is greater than the counting time, and the processor updates the counting time of the real-time clock to the accumulated time length when the network connection is working normally.

6. The computer system as claimed in claim 5, wherein the real-time clock continually accumulates the accumulated time length when the accumulated time length is not greater than the counting time, and the processor tests whether the network connection is working normally when the accumulated time length reaches an extended time, wherein the extended time is the counting time plus a period of expansion time, and the processor updates the counting time of the real-time clock to the accumulated time length when the network connection is working normally, the processor uses the network card to re-establish the network connection when the network connection is interrupted.

7. The computer system as claimed in claim 5, wherein the processor uses the real-time clock to regularly wake up the computer system, and tests whether the network connection is working normally, and the processor controls the real-time clock to restore the counting time to a predetermined value when the network connection is interrupted, and uses the network card to re-establish the network connection.

8. The computer system as claimed in claim 5, wherein the processor controls the computer system to enter the power saving mode according to an operation of the user or a predetermined condition.

* * * * *